United States Patent Office 3,352,159
Patented Nov. 14, 1967

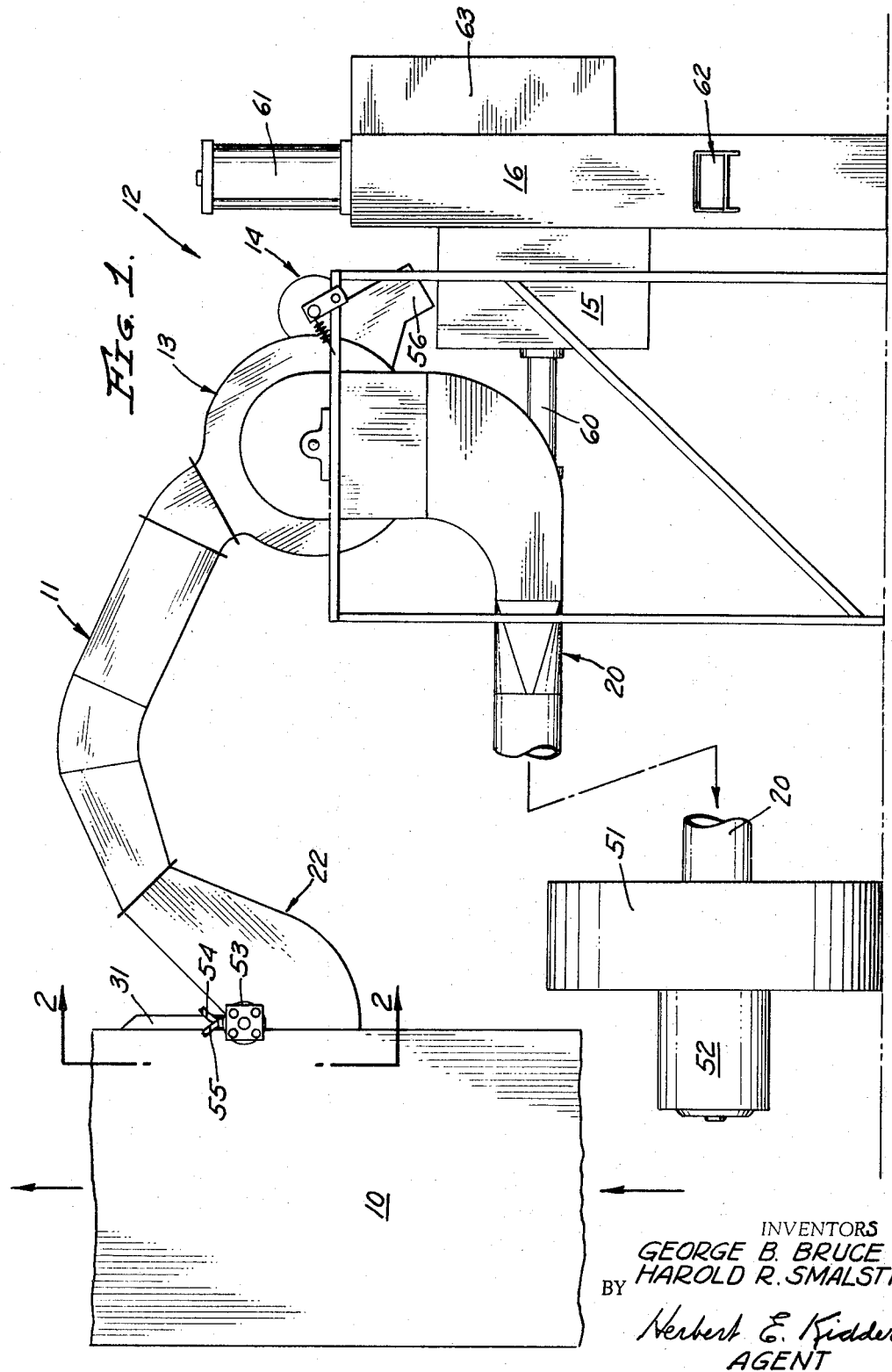

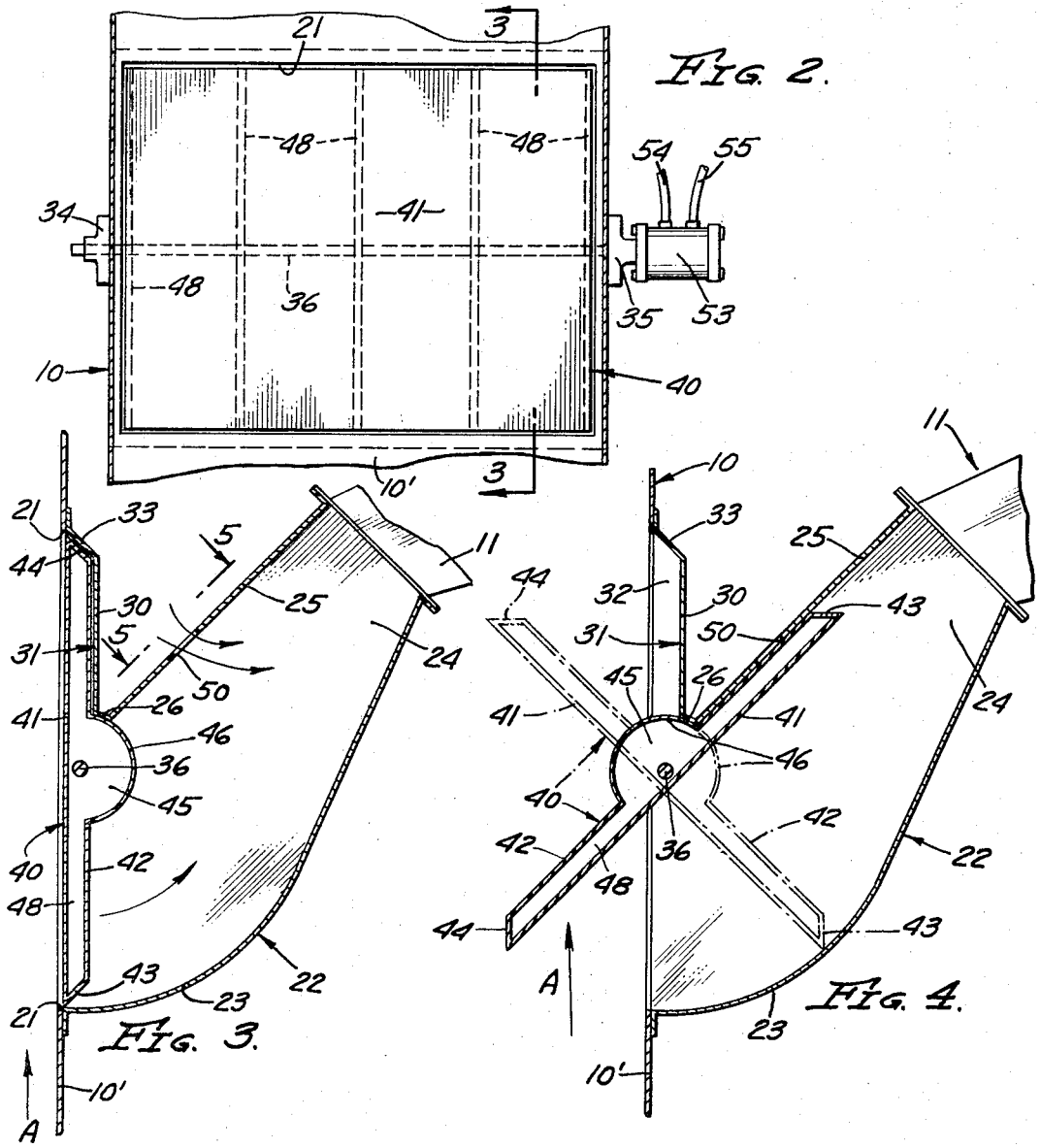

3,352,159
AUTOMATIC COTTON LINT SAMPLER
George B. Bruce and Harold R. Smalstig, Bakersfield,
Calif., assignors to Brusmatic Inc., Bakersfield, Calif.,
a corporation of California
Filed Nov. 30, 1966, Ser. No. 597,837
5 Claims. (Cl. 73—422)

ABSTRACT OF THE DISCLOSURE

The invention is a sampling gate mounted flush in one side of the flue that conveys cotton lint from the last cleaning stage of a gin to the maling station. When opened, the gate serves to divert some of the air-borne lint through a branch flue to a sample collector. The said gate is pivoted intermediate its ends and, as it opens, the downstream end thereof swings forwardly into the stream of air, while the other end swings back into said branch flue. When fully opened, the gate extends forwardly into the flue at a 45 degree angle, with the end that was formerly downstream of the pivot axis now upstream thereof. As the gate closes, any lint caught on its leading edge is swept away as the said edge swings downstream of the pivot axis.

Background of the invention

This invention pertains to mechanical devices for sampling cotton bales during ginning, and more particularly to an improved, self-cleaning gate which periodically swings out into the flue to divert a portion of the airborne lint to the sample collector.

The use of mechanical sampling devices has been developed in relatively recent times to overcome the objectionable features of the conventional method of sampling bales, which involves cutting two openings about 6 inches wide by 1 to 2 feet long in two sides of the bale and removing a portion of cotton from each of these openings. The two portions are placed together to form an individual sample, by which the bale is graded on the basis of staple length, cleanliness, and other factors affecting the quality of the cotton. Samples obtained in this way are not always representative of the bale contents, since they are taken primarily from the outer sections of two sides of the bale, and the interior of the bale may not be the same as the outer layers of the said two sides. Also, the portions of cotton drawn from opposite sides of the bale in cut sampling are often of different qualities, in which case the entire bale is graded on the basis of the lower quality, although the greater part of the bale may be of the higher quality. Other disadvantages of cut sampling are that the bale is mutilated and given an unsightly appearance, there is considerable added fire hazard, the bale quickly become contaminated, and there is considerable loss in value of the cotton.

With a view to overcoming most of these disadvantages, there have been mechanical samplers developed in recent years to extract a truly representative sample of the cotton at the time it is baled. Such samplers consist basically of three parts: (1) a valve, or gate, which opens periodically to divert a portion of the air-borne lint as it is conveyed from the cleaner to the baler; (2) a conveyor duct and condenser; and (3) a packaging unit for pressing the sample and injecting it into a paper container. While these mechanical samplers have, in general, proved to be a great improvement over cut sampling, there has been considerable difficulty experienced with the valves, or gates, which swing out into the path of the air stream and tend to collect lint on their leading edges. This accumulated lint hangs persistently on the leading edge of the gate, and sometimes prevents the gate from closing completely between sample-gathering operations. As a consequence, some of the air with entrained lint leaks into the sampler between openings of the gate, and this results in a defective sample. At other times, the accumulation of cotton on the leading edge of the gate may be dislodged and swept into the sampler, where it provides a non-representative portion of the sample.

Summary of the invention

The primary object of the invention is to provide a self-cleaning by-pass valve or gate for a mechanical sampler, which is trouble-free and so constructed that there is no tendency for lint to accumulate and remain on the leading edge thereof. Any lint caught on the leading edge of the gate is immediately swept away by the high-velocity airstream as the gate closes. As a result, the gate closes tightly after each sampling operation, and there is no leakage between samplings.

Another important object of the invention is to provide a sampling gate which is recessed into the wall of the main duct when closed, so that nothing protrudes into the airstream to catch lint.

Still a further object of the invention is to provide a sampling gate one edge of which cooperates with vent holes in the by-pass conduit so that high-velocity jets of air are drawn through the vent holes as the gate starts to close, and these jets of air blow any lint off the said one edge. When the gate is closed, the said vents are opened, and this relieves the vacuum pressure within the by-pass duct to prevent the latter from collapsing. At the same time, air passing through the vent holes provides a vehicle to carry the lint along the duct to the sampler when the gate is closed.

Description of the drawings

FIGURE 1 is an elevational view of a section of the lint flue with its associated mechanical sampler, showing the housing which contains the valve gate of the present invention;

FIGURE 2 is a slightly enlarged sectional view taken at 2—2 in FIGURE 1, showing the closed valve gate in elevation;

FIGURE 3 is a further enlarged sectional view through the closed sampling gate and by-pass conduit taken at 3—3 in FIGURE 2;

FIGURE 4 is a view similar to FIGURE 3, showing the gate fully opened (solid lines) and half-way between open and closed positions (phantom lines); and FIGURE 5 is a fragmentary elevational view, as seen at 5—5 in FIGURE 3, showing the air vent holes in the top wall of the by-pass duct.

Description of the preferred embodiment

In the drawings, the reference numeral 10 designates a lint flue for pneumatically conveying cotton lint from the last cleaning stage of a gin to the baling station (not shown), the said cotton lint being blown in the direction indicated by the arrows, by a high-velocity blast of air propelled by powerful blowers (not shown). The lint flue 10 may take any desired configuration, but is here shown as a sheet metal conduit of rectangular cross-section.

Connected to one side wall of the lint flue 10 is a bypass conduit 11, the other end of which is connected to a sample-packaging apparatus 12, consisting of a condenser 13, compression roller and doffer 14, hopper 15, and packaging press 16. A suction pipe 20 is connected to one end of the condenser housing, the other end of pipe 20 being connected to the suction side of the blower which propels the air through the flue 10.

As best shown in FIGURES 2 and 3, there is a rectangular opening 21 cut through one side wall 10′ of the lint flue, and mounted on the outside of the side wall 10' so as to completely surround the opening 21 is a gate valve housing 22. The housing 22 includes a cylindrically curved bottom portion 23, which fairs into a tapered throat portion 24, the outer end of which is connected to the by-pass conduit 11. The top side of housing 22 is formed by a flat wall 25 which extends upwardly and outwardly from the flue wall 10' at approximately 45 degrees angle thereto. At its lower end, the top wall 25 is joined to a short, cylindrically curved section 26, which terminates at the bottom 30 of a shallow, flat, recess well 31. The side walls 32 (see FIG. 4) of the recess well 31 are perpendicular to the bottom 30, but the end wall 33 is inclined, as shown, to receive the bevelled end of the valve gate.

Extending transversely through the housing 22 and journaled at its ends in bearings 34 and 35 is a shaft 36, upon which a valve gate 40 is fixedly mounted. The gate 40 is a generally flat, hollow body that is rectangular in outline, as seen in FIG. 2, and fits snugly within the rectangular opening 21. As shown in the cross-sectional views of FIGS. 3 and 4, the gate 40 is made up of inner and outer panels 41 and 42 of boiler plate, which are welded to opposite sides of a plurality of parallel frame members 48 that are fixed to the shaft 36 at intervals along the length thereof. Each of the frame members 48 has its ends cut off at an angle of approximately 45 degrees, as shown, and the end portions of the outer panel 42 are bent down to lie flat against these angled end portions, thereby forming beveled ends 43 and 44 on the gate. The purpose of the bottom bevel 43 is to provide a substantially line-contact between the gate 40 and the cylindrically curved portion 23 of the housing 22, which allows for a close, sealing fit between them, with minimum likelihood of binding. The top bevel 44 provides a sharp, wedge-shaped leading edge on the gate when the latter is opened, as shown in FIG. 4. Another advantage of having both edges 43 and 44 beveled the same, is that the gate 40 is symmetrical, and can be installed with either end 43, 44 at the top. The top bevel 44 fits snugly against the inclined end wall 33 of the recess well 31, as mentioned earlier.

Midway between the top and bottom ends of the gate 40, the frames 48 are provided with semi-circular portions 45 on the sides facing into the housing 22, and the outer panel is cylindrically curved at 46, to follow the curvature of the portion 45. Both the curved portions 45 and cylindrical section 46 have their geometric centers at the axis of the rod 36, and the outer surface of the section 46 slidably engages the curved section 26 of the housing 22 to provide a seal at that point. Thus, there is never any gap between the outer side 42 of the gate 40 and the top of the housing 22, above the shaft 36, regardless of the position of the gate.

The top wall 25 of housing 22 has a line of uniformly spaced, circular vent holes 50 extending transversely across its width, as shown in FIG. 5. These vent holes 50 allow air to rush into the housing 22 and along the by-pass conduit 11 when the gate 40 is closed, thereby providing the vehicle to carry the cotton lint to the packaging apparatus 12. As mentioned earlier, air is sucked through the by-pass conduit 11 by a suction pipe 20, which is connected to the intake side of a blower 51 that is driven by a motor 52. The blower 51 is preferably the same one that propels the air through the lint flue 10, and this arrangement eliminates the need for a separate blower for the sampling apparatus. When the gate is opened, the back side 42 thereof closes against the vent holes 50, as shown in FIG. 4, stopping the flow of air through the vent holes. As the gate 40 starts to close and end 43 moves downwardly away from the top wall 25 of the housing, vent holes 50 are uncovered, and jets of high-velocity air rush through them, impinging against the end of the gate to carry away any lint that might be caught thereon.

FIG. 3 shows the gate 40 fully closed, and it will be noted that the inner face 41 is flush with the inner surface of the flue wall 10'. Air flowing through the lint flue 10 is traveling in the direction indicated by the arrow A, and with respect to this airflow, the top end of the gate 40 is downstream of the pivot axis 36, while the bottom end 43 is upstream thereof. When the gate is opened, it turns in the counterclockwise direction about the shaft 36, passing through the intermediate position shown in phantom lines in FIG. 4. In doing so, the top end 44 of the gate swings out into the flue 10 and downwardly, against the direction of airflow. At the same time, the bottom end of the gate swings back into the housing 22, and the sharp edge of the beveled end 43 follows the cylindrically curved portion 23 until the gate is almost half-way between the closed and open positions, at which point the end 43 leaves the bottom of the housing 22 and swings up to the position shown in solid lines. In the fully open position (shown in solid lines in FIG. 4) the upper half of the gate that was formerly downstream of the pivot axis 36 is now projecting forwardly into the airstream at an angle of about 45 degrees, and this serves as a deflector to divert a portion of the airstream with its entrained cotton lint through the by-pass conduit 11 to the sample-packaging apparatus 12. In this position, the leading edge of the gate end 44 is, of course, subject to picking up cotton lint rapidly. However, the gate remains open for only a fraction of a minute and is then closed; the said gate being opened and closed at the rate of about once per minute during the 7 to 10 minutes that it takes to form each bale. Thus, each sample from the lint flue during the formation of a bale consists of from 7 to 10 subsamples, which are accumulated and pressed into a bat, which may be either 18 or 27 inches long, 5 inches wide, and 2 or 2¼ inches in depth.

As the gate 40 swings in the clockwise direction from the open to the closed position, the leading edge 44 moves up past the level of the shaft 36 and takes a downstream position with respect to the latter. In this downstream position, any cotton lint caught on the edge 44 is swept away by the high-velocity wind in the line flue, and the gate edge is thus cleaned each time that the gate is closed. In like manner, the edge 43 is swept clean as it swings forwardly, until the sharp edge 43 of the gate engages and wipes along the curved surface 23. When the gate has closed to this point, the suction in the by-pass conduit 11 draws air in through the vent holes 50, and this air carries the cotton lint along the conduit 11 to the apparatus 12.

The gate 40 is moved between open and closed positions by a vane-type pneumatic actuator, 53, which is supplied with high-pressure air by lines 54 and 55. The actuator 53 is controlled by a solenoid valve (not shown), which causes the gate to open in the counter-clockwise direction, remain open for a short time, and then close in the clockwise direction. The drive shaft of the actuator 53 may be connected directly to the projecting end of shaft 36, just beyond housing 35.

The samples of cotton lint are conveyed through the by-pass conduit 11 to condenser 13, from which the lint is stripped by the compression roller and doffer 14, and discharged through a chute 56 into the hopper 15. At the completion of each sub-sampling (i.e., each time that the gate 40 is closed) an air cylinder 60 pushes the accumulated lint into the packaging press 16, where it is compressed by another air cylinder 61 and insterted into a paper wrapping. The finished sample is ejected through an ejection chute 62. Controls for operating the packaging machine 12 and gate actuator 53 are contained within a control box 63.

While we have shown and described in considerable detail what we believe to be the preferred form of our invention, it will be understood by those skilled in the art that various changes may be made in the shape and arrangement of the several parts, without departing from the broad scope of the invention, as set forth in the following claims.

What is claimed is:

1. In combination with a lint flue for pneumatically conveying cotton lint from one station to another; a by-pass conduit joined at one end to one side wall of said lint flue; and a sample-packaging apparatus at the other end of said by-pass conduit, wherein the improvement comprises:

a valve gate supported for swinging movement about a pivot axis intermediate its ends, said gate being swingable between an open position and a closed position;

one end portion of said gate being disposed substantially flush with said one side wall of said lint flue downstream (with respect to the airflow) of said pivot axis when the gate is closed, said one end portion swinging to a forwardly inclined position upstream of said pivot axis when the gate is opened;

the other end portion of said gate blocking said by-pass conduit when the gate is in said closed position, and said other end portion swinging back into said by-pass conduit so as to open the same to movement of air-borne lint through the by-pass conduit when the gate is in said open position; and means for swinging said gate between said open and closed positions.

2. The valve gate of claim 1, wherein said gate is rectangular in configuration, the side edges of said gate being parallel to the direction of airflow in said flue and the ends thereof being transverse to said airflow, said pivot axis being midway between said ends and parallel thereto, and said one end portion of said gate being inclined forwardly into the airstream at an angle of about 45 degrees with respect thereto when the gate is opened.

3. The valve gate of claim 1, wherein said by-pass conduit is connected to the intake side of a blower, and said gate is mounted within a gate housing, said other end portion of said gate lying flat against one wall of said housing, when the gate is opened, and said one wall of said housing having at least one vent hole provided therein which is closed by said other end portion when the gate is opened.

4. The valve gate of claim 1, wherein said gate is mounted within a gate housing, said housing having one wall thereof cylindrically curved as it approaches junction with said lint flue, said cylindrically curved wall having its geometric center at said pivot axis, and said other end portion of said gate wiping on said cylindrically curved wall in sealing contact therewith.

5. The valve gate of claim 1, wherein said gate is pivotally mounted within a gate housing, said housing having a relatively shallow, flat-bottomed recess well on the side downstream of said pivot axis, said recess well being adapted to receive said one end portion of said gate when the gate is closed, said recess well terminating adjacent said pivot axis in a cylindrically curved portion having its center at said pivot axis, and said gate having a cylindrically curved portion centered on said pivot axis and slidably engaging said cylindrically curved portion of said housing.

References Cited

UNITED STATES PATENTS

| | | | |
|---|---|---|---|
| 1,219,701 | 3/1917 | Cass | 19—38 |
| 2,320,544 | 6/1943 | Gaus et al. | 19—156.3 X |
| 2,955,469 | 10/1960 | Marble | 73—422 |
| 3,006,367 | 10/1961 | Thompson et al. | |
| 3,042,360 | 7/1962 | Sneddon | 251—298 X |
| 3,253,863 | 5/1966 | Hilliard | 302—28 |

OTHER REFERENCES

Automatic Mechanical Equipment for Sampling Cotton Bales During Ginning, a publication of the United States Department of Agriculture, Production and Marketing Administration Cotton Branch, Washington, D.C. 1951.

MERVIN STEIN, *Primary Examiner.*

I. C. WADDEY, JR., *Assistant Examiner.*